UNITED STATES PATENT OFFICE.

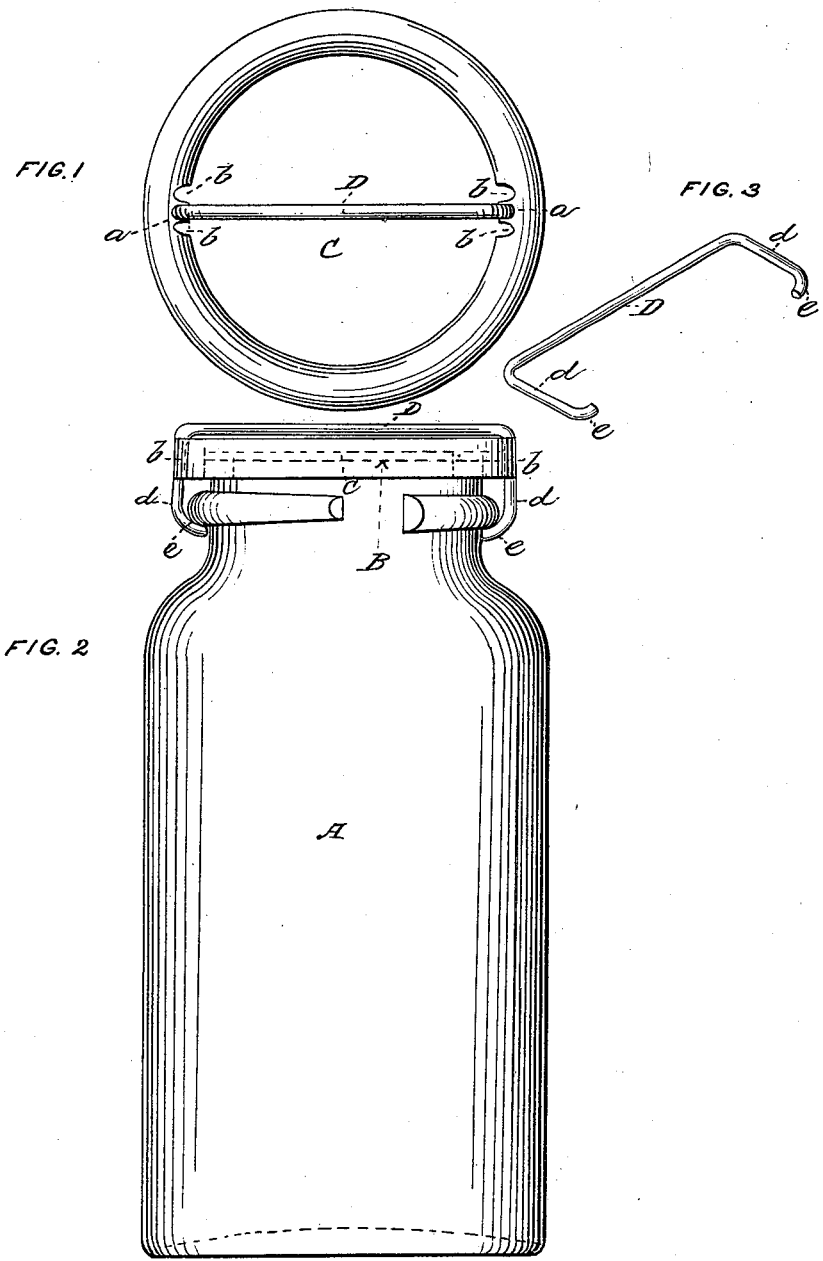

THEODORE F. WOODWARD, OF WINSLOW, NEW JERSEY, ASSIGNOR TO HAY & CO., OF PHILADELPHIA, PENNSYLVANIA.

IMPROVEMENT IN FASTENINGS FOR FRUIT-JARS.

Specification forming part of Letters Patent No. 109,703, dated November 29, 1870.

*To all whom it may concern:*

Be it known that I, THEODORE F. WOODWARD, of Winslow, in the county of Camden and State of New Jersey, have invented an Improvement in Fastenings for Fruit-Jars, of which the following is a specification.

The nature of my invention consists in the construction of the cover of the jar with vertical grooves in its edges opposite each other, and springing therein downwardly-projecting arms of a clamping-wire, which rests on the top of the cover. The arms have inwardly-projecting hooks, which are caught under double inclines on opposite sides of the jar, so that as the cover is turned partly around it is tightened, as hereinafter described, the wire clamp being kept in the fixed position on the cover by means of said grooves in the cover, in which the arms are situated.

To enable others to make and use my improvement, I will now give a full description thereof.

In the accompanying drawings, which make a part of this specification, Figure 1 is a top view of a jar with the improved fastening. Fig. 2 is a side elevation of the same. Fig. 3 is an isometrical view of the clamping-wire D.

Like letters in all the figures indicate the same parts.

A represents the jar.

B is the gum gasket.

C is the cover of the jar. It is constructed with vertical grooves $a\ a$ in its edge, formed by means of the lugs $b\ b$ and $b\ b$.

D is a wire clamp, represented in detail in Fig. 3. It has vertical arms $d\ d$, which are provided with hooks $e\ e$ on their inner sides, which, when the cover is put in place on the jar and the hook passed under the double inclines $f\ f$ on the sides of the neck of the jar as the cover is turned partly around, are pressed hard against the inclines and confine the cover. The hooks $e\ e$ of the wire clamp D are pressed outward in bringing the latter into its place on the cover C, then the arms $d\ d$ spring into the grooves $a\ a$, and the hooks come beneath the rim of the cover, whereby the clamp is retained in its position on the cover when the latter is unfastened and removed from the jar.

What I claim as new, and desire to secure by Letters Patent, is—

The combination of the wire clamp D, constructed substantially as described, with the cover C, having vertical grooves $a\ a$, and with the jar A, having double inclines $f\ f$, substantially in the manner and for the purpose set forth.

In testimony that the above is my invention I have hereunto set my hand and affixed my seal this 31st day of August, 1870.

THEODORE F. WOODWARD. [L. S.]

Witnesses:
   C. P. WESTCOTT,
   B. C. VANAMANN.